ized- (12) United States Patent
    Sakai (10) Patent No.: US 11,254,364 B2
(45) Date of Patent: Feb. 22, 2022

(54) VEHICLE BODY SIDE STRUCTURE

(71) Applicant: HONDA MOTOR CO., LTD., Tokyo (JP)

(72) Inventor: Hiroyuki Sakai, Wako (JP)

(73) Assignee: HONDA MOTOR CO., LTD., Tokyo (JP)

( * ) Notice: Subject to any disclaimer, the term of this patent is extended or adjusted under 35 U.S.C. 154(b) by 3 days.

(21) Appl. No.: 16/861,880

(22) Filed: Apr. 29, 2020

(65) Prior Publication Data

US 2020/0353989 A1    Nov. 12, 2020

(30) Foreign Application Priority Data

May 8, 2019    (JP) .............................. JP2019-088586

(51) Int. Cl.
    *B62D 25/04*    (2006.01)
    *B62D 25/02*    (2006.01)
    *B62D 27/02*    (2006.01)
    *B62D 25/06*    (2006.01)

(52) U.S. Cl.
    CPC ........... *B62D 25/04* (2013.01); *B62D 25/025* (2013.01); *B62D 25/06* (2013.01); *B62D 27/023* (2013.01); *B62D 27/026* (2013.01)

(58) Field of Classification Search
    CPC .............................. B62D 25/04; B62D 27/023
    USPC ........................................ 296/193.06, 187.12
    See application file for complete search history.

(56) References Cited

U.S. PATENT DOCUMENTS

| 2012/0153676 A1 | 6/2012 | Shono |
| 2015/0115654 A1 | 4/2015 | Honda |
| 2017/0088184 A1 | 3/2017 | Emura |
| 2019/0233019 A1 | 8/2019 | Walch et al. |

FOREIGN PATENT DOCUMENTS

| DE | 102016118366 A1 | 3/2018 |
| JP | 2004-314845 A | 11/2004 |
| JP | 2013-233838 A | 11/2013 |
| WO | 2011/024552 A1 | 3/2011 |
| WO | 2015/146903 A1 | 10/2015 |

OTHER PUBLICATIONS

Japanese Office Action with English translation dated Mar. 2, 2021, 9 pages.

*Primary Examiner* — Dennis H Pedder
(74) *Attorney, Agent, or Firm* — Rankin, Hill & Clark LLP (57) ABSTRACT

Provided is a vehicle body side structure to reduce a center pillar in weight and suitably prevent deformation of the center pillar and separation of a stiffener from a roof side rail due to a side collision load. The vehicle body side structure includes a stiffener having a stiffener upper part provided above a central part in a height direction of a center pillar. The upper end of the stiffener upper part is joined to a roof side rail from an outer side in the vehicle width direction. The stiffener upper part has a trough extending in the vertical direction of the vehicle and recessed inward in the vehicle width direction. The trough 81*d* is recessed deeper as coming closer to a central part in the vertical direction of the stiffener upper part from the upper end and a lower end of the stiffener upper part.

9 Claims, 8 Drawing Sheets

FIG. 8

VEHICLE BODY SIDE STRUCTURE

CROSS-REFERENCE TO RELATED APPLICATION

The present application claims the benefit of priority to Japanese Patent Application No. 2019-088586 filed on May 8, 2019, the disclosures of all of which are hereby incorporated by reference in their entireties.

TECHNICAL FIELD

The invention relates to vehicle body side structure.

BACKGROUND OF THE INVENTION

Germany Patent Application Publication No. 102016118366A1 and Japanese Patent Application Publication No. 2004314845A each disclose a structure in which a center pillar is reinforced with a stiffener (reinforcing member) at a portion of a vehicle higher than a belt line of a vehicle. The center pillar is a pillar including an inner center pillar and an outer center pillar, which are joined to each other with flanges thereof overlapped, extending vertically to connect a side sill on a lower side and a roof side rail on an upper side. Especially, the outer center pillar is joined to an outer side of the roof side rail at an upper part of the vehicle, and the inner center pillar is joined to an inner side of the roof side rail. Further, the stiffener is provided inside the center pillar and joined to the inner center pillar. Note that the vertical direction, the width direction, and the longitudinal direction are defined based on an orientation of a vehicle body or a driver while driving. Further, the belt line (also referred to as a waist line) is a line running in the lateral direction along the lower ends of the side windows of the vehicle body, is an upper end line of a lower part of the vehicle body to run in the horizontal direction along doors, and is a line to separate an upper part of the vehicle body from the lower part of the vehicle body at window positions.

SUMMARY OF THE INVENTION

However, a part below the belt line of the center pillar (referred to as a belt line lower part) has a thick cross section and is strong to support the front and rear side doors, but a part above the belt line (referred to as a belt line upper part) has a thin cross section to have light weight and to secure the visibility of the front and rear side doors. When a side collision load is applied to the belt line lower part of the center pillar, the upper end (roof side rail joint part) and the lower end (part corresponding to the belt line) of the belt line upper part serves as support points with respect to the belt line lower part having high strength and rigidity. A central part of the belt line upper part receives stress so as to be deformed inward (toward a vehicle cabin) as three-point bending. The stress is supported by the stiffener and transmitted to the inner center pillar, to act on the inner center pillar in a direction to be separated from the roof side rail.

The present invention has been made in view of the problem as described above, and provides a vehicle body side structure in which the weight of a center pillar is reduced and deformation of the center pillar and separation of the center pillar from a roof side rail due to a side collision load is appropriately prevented.

To solve the problem described above, a vehicle body side structure of the present invention includes: a roof side rail extending in a longitudinal direction of a vehicle on an upper side and a lateral side of the vehicle; a center pillar extending downward of the vehicle from the roof side rail and formed as an assembly of an outer center pillar and an inner center pillar; and a stiffener extending in a vertical direction of the vehicle within the center pillar, wherein the stiffener has a stiffener upper part provided above a central part in a height direction of the center pillar, wherein the stiffener upper part is joined at an upper end thereof to the roof side rail from an outer side in a vehicle width direction and has a trough extending in the vertical direction of the vehicle and recessed inward in the vehicle width direction, and wherein the trough is recessed deeper as coming closer to a central part in the vertical direction of the stiffener upper part from the upper end and a lower end of the stiffener upper part.

According to the present invention, the trough extending along the longitudinal direction of the stiffener and recessed inward in the vehicle width direction is formed to be the deepest at the central part in the vertical direction of the belt line upper part to be reinforced most in the three-point bending of the center pillar. The closer the center pillar extends toward the upper end and the lower end, the less the center pillar needs to be reinforced and thus the shallower the trough protrudes toward the vehicle cabin. Accordingly, the stiffener is reduced in size, to have the center pillar reduced in weight and increased in rigidity. Further, the center pillar is suitably prevented from being deformed and separated from the roof side rail due to the side collision load. Furthermore, the stress acting on the stiffener is transmitted so as to press the roof side rail outward (transmitted as a compression load), to suitably prevent the stiffener 80 from being separated due to the side collision load.

DETAILED DESCRIPTION OF THE PREFERRED EMBODIMENTS

Hereinafter, a description will be given of an embodiment of the present invention, in which a vehicle body side structure of the present invention is applied to a structure around a left center pillar of a vehicle (automobile, for example) as an example, with reference to the drawings appropriately. The same components are denoted by the same reference numerals, and duplicate descriptions thereof are omitted. Terms indicating directions such as vertical, longitudinal, right and left (vehicle width direction) are defined based on an orientation of occupants (driver) of the vehicle.

<Vehicle Body Side Structure>

Figure 1:
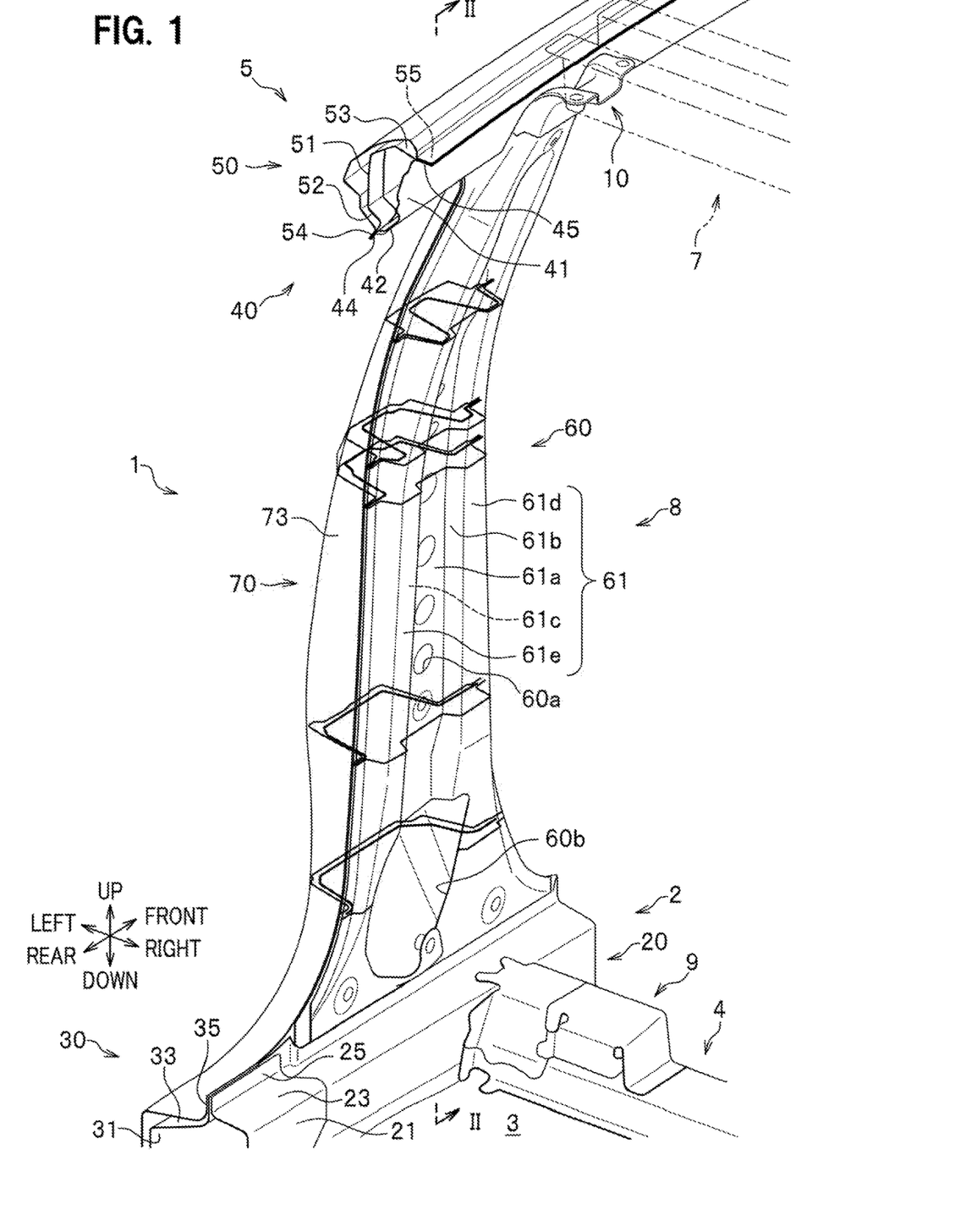
FIG. 1 is a perspective view of a vehicle body side structure according to an embodiment of the present invention, schematically shown, as viewed from a rear side in a vehicle cabin.
Figure 2:
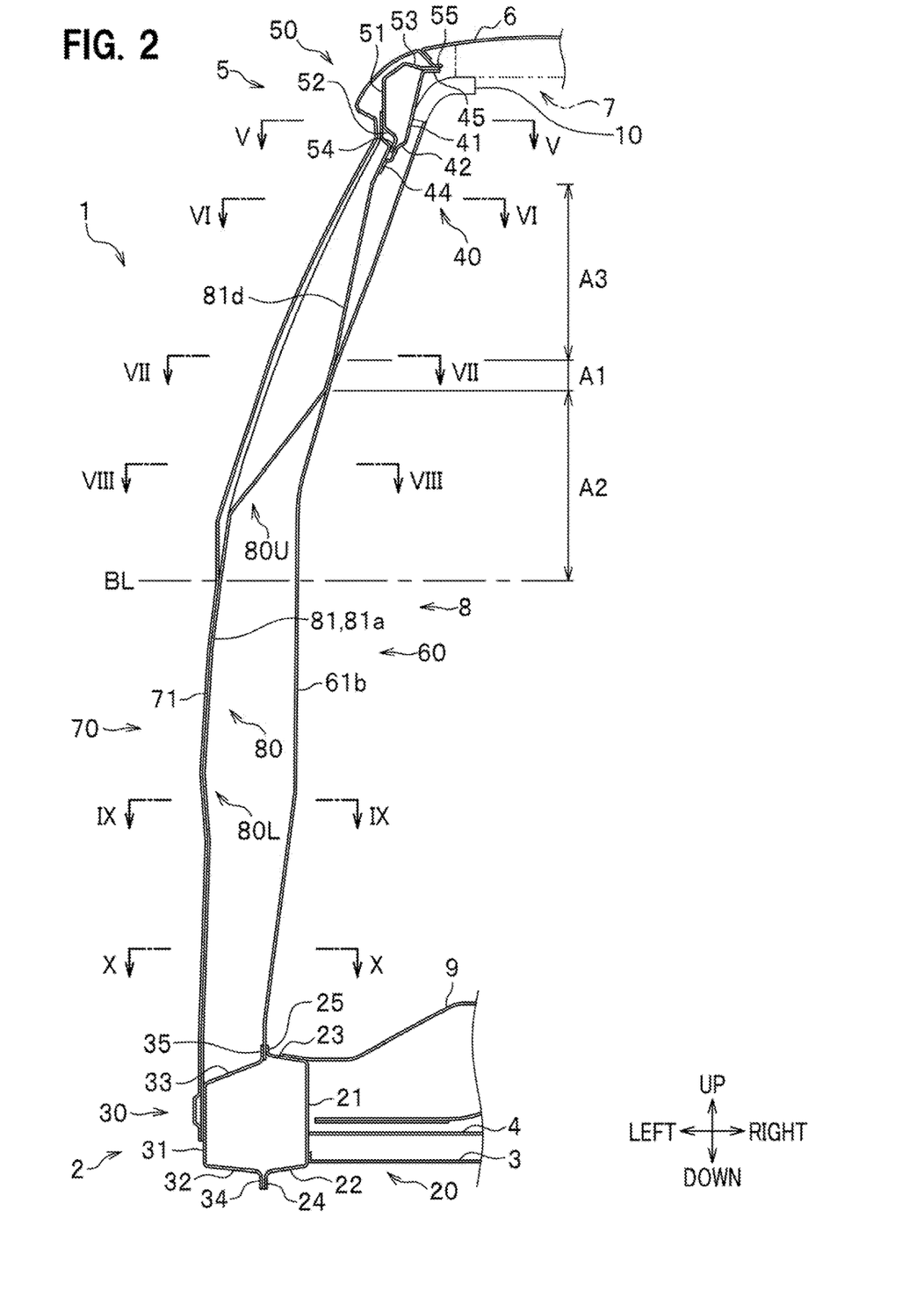
FIG. 2 is a cross-sectional view of a trough taken along a line II-II in FIG. 1.

As shown in FIGS. 1 and 2, a vehicle body side structure 1 according to the embodiment of the present invention includes: a side sill 2; a floor panel 3; a cross member 4; a roof side rail 5; a roof panel 6; a roof arch 7; a center pillar 8; a seat mounting bracket 9; and a roof arch connecting bracket 10.

<Side Sill>

The side sill 2 is a metal frame member extending in the longitudinal direction at the lower end and at an end in the vehicle width direction of the vehicle. The side sill 2 has a substantially rectangular closed-cross section in front view. The side sill 2 is formed by a combination of an inner side sill 20 to form an inner side in the vehicle width direction of the side sill 2 and an outer side sill 30 to form an outer side in the vehicle width direction of the side sill 2.

<<Inner Side Sill>>

The inner side sill 20 integrally includes an inner wall 21 (inner wall in the vehicle width direction) extending in the longitudinal direction and the vertical direction, a lower wall 22 extending outward in the vehicle width direction from the lower end of the inner wall 21, and an upper wall 23 extending outward in the vehicle width direction from the upper end of the inner wall 21. Further, the inner side sill 20 integrally includes a flange 24 extending downward from the outer end in the vehicle width direction of the lower wall 22 and a flange 25 extending upward from the outer end in the vehicle width direction of the upper wall 23.

<<Outer Side Sill>>

The outer side sill 30 integrally includes an outer wall 31 (outer wall in the vehicle width direction) extending in the longitudinal direction and the vertical direction, a lower wall 32 extending inward in the vehicle width direction from the lower end of the outer wall 31, and an upper wall 33 extending inward in the vehicle width direction from the upper end of the outer wall 31. Further, the outer side sill 30 integrally includes a flange 34 extending downward from the inner end in the vehicle width direction of the lower wall 32 and a flange 35 extending upward from the inner end in the vehicle width direction of the upper wall 33.

The flange 24 and flange 34 are joined to each other by welding or the like. The flange 25 and flange 35 are joined to each other by welding or the like. Note that the side sill 2 may include a stiffener as reinforcing member interposed between the inner side sill 20 and the outer side sill 30, as with the center pillar 8 to be described below.

<Floor Panel>

The floor panel 3 is a member provided between a pair of right and left side sills 2 to form a floor of the vehicle. The ends in the vehicle width direction of the floor panel 3 are joined to inner surfaces in the vehicle width direction of the inner walls 21 of the inner side sills 20 by welding or the like.

<Cross Member>

The cross member 4 is a metal frame member provided between the pair of right and left side sills 2. The cross member 4 itself has a substantially U-shaped cross section having an opening on the lower side in side view, and has a substantially rectangular closed-cross section in side view in cooperation with the floor panel 3.

The cross member 4 integrally includes an upper wall extending in the longitudinal direction and the vehicle width direction, a front wall extending downward from the front end of the upper wall, and a rear wall extending downward from the rear end of the upper wall. Further, the cross member 4 integrally includes a flange extending forward from the lower end of the front wall and a flange extending rearward from the lower end of the rear wall.

The pair of front and rear flanges of the cross member 4 is joined to the upper surface of the floor panel 3 by welding or the like. The ends in the vehicle width direction of the cross member 4 is joined to inner surfaces in the vehicle width direction of the inner walls 21 of the inner side sills 20 by welding or the like.

<Roof Side Rail>

The roof side rail 5 is a metal frame member extending in the longitudinal direction of the vehicle on an upper side and a lateral side of the vehicle. The roof side rail 5 has a substantially rectangular closed-cross section in front view. The roof side rail 5 is formed by an combination of an inner roof side rail 40 to form an inner side in the vehicle width direction of the roof side rail 5 and an outer roof side rail 50 to form an outer side in the vehicle width direction of the roof side rail 5.

<<Inner Roof Side Rail>>

The inner roof side rail 40 integrally includes an inner wall (inner wall in the vehicle width direction) 41 extending in the longitudinal direction and the vertical direction and a lower wall 42 extending outward in the vehicle width direction from the lower end of the inner wall 41. Further, the inner roof side rail 40 integrally includes a flange 44 extending downward from the outer end in the vehicle width direction of the lower wall 42 and a flange 45 extending inward in the vehicle width direction from the upper end of the inner wall 41. A part of the flange 45 is formed to extend under a flange 55 of the outer roof side rail 50 to be described below.

<<Outer Roof Side Rail>>

The outer roof side rail 50 integrally includes an outer wall 51 (outer wall in the vehicle width direction) extending in the longitudinal direction and the vertical direction, a lower wall 52 extending inward in the vehicle width direction from the lower end of the outer wall 51, and an upper wall 53 extending inward in the vehicle width direction from the upper end of the outer wall 51. Further, the outer roof side rail 50 integrally includes a flange 54 extending downward from the inner end in the vehicle width direction of the lower wall 52 and the flange 55 extending inward in the vehicle width direction from the inner end in the vehicle width direction of the upper wall 53.

The flange 44 and flange 54 are joined to each other by welding or the like. The flange 45 and flange 55 are joined to each other by welding or the like. Note that the roof side rail 5 may have a configuration to include a stiffener as reinforcing member interposed between the inner roof side rail 40 and the outer roof side rail 50, as with the center pillar 8 to be described below.

<Roof Panel>

The roof panel 6 is a metal plate-shaped member provided between the pair of right and left roof side rails 5 to form a ceiling surface of the vehicle. The roof panel 6 forms an outer surface (skin) of the vehicle.

<Roof Arch>

The roof arch 7 is a metal frame member provided between the pair of right and left roof side rails 5. The roof arch 7, as a single member, has a substantially U-shaped cross-sectional shape having an opening on an upper side in side view, to have a substantially rectangular closed-cross section in side view in cooperation with the roof panel 6. The roof arch 7 integrally includes a lower wall extending in the longitudinal direction and the vehicle width direction, a front wall extending upward from the front end of the lower wall, and a rear wall extending upward from the rear end of the lower wall. Further, the roof arch 7 integrally includes a flange extending forward from the upper end of the front wall and a flange extending rearward from the upper end of the rear wall.

The pair of front and rear flanges of the roof arch 7 is joined to the upper surface of the roof panel 6 with a mastic sealer or the like.

<Center Pillar>

The center pillar 8 is a metal frame member extending in the vertical and provided between the side sill 2 and the roof side rail 5. The center pillar 8 (assembly of an inner center pillar 60 and an outer center pillar 70 to be described below) has a substantially rectangular closed-cross section in plan view. The width in the longitudinal direction of the center pillar 8 is set relatively small above a belt line BL (hereinafter, referred to as a belt line upper part) for securing visibility, and is set relatively large below a belt line BL (hereinafter, referred to as a belt line lower part) for door installation. The center pillar 8 is formed by a combination of the inner center pillar 60 to form an inner side in the vehicle width direction of the center pillar 8, the outer center pillar 70 to form an outer side in the vehicle width direction of the center pillar 8, and a stiffener 80 arranged inside between the inner center pillar 60 and the outer center pillar 70 for reinforcement.

<<Inner Center Pillar>>

The inner center pillar 60 integrally includes an inner wall 61 (inner wall in the vehicle width direction) extending in the longitudinal direction and the vertical direction, a front wall 62 extending outward in the vehicle width direction from the front end of the inner wall 61, and a rear wall 63 extending outward in the vehicle width direction from the rear end of the inner wall 61. Further, the inner center pillar 60 integrally includes a flange 64 extending forward from the outer end in the vehicle width direction of the front wall 62 and a flange 65 extending rearward from the outer end in the vehicle width direction of the rear wall 63.

The inner wall 61 integrally includes a coupling part 61*a* at a central part in the longitudinal direction, a side wall 61*b* forming a trough (groove) recessed inward in the vehicle width direction from the front end of the coupling part 61*a*, and a side wall 61*c* forming a trough (groove) recessed inward in the vehicle width direction from the rear end of the coupling part 61*a*. Further, the inner wall 61 integrally includes a trough wall 61*d* extending forward from the inner end in the vehicle width direction of the side wall 61*b* and a trough wall 61*e* extending rearward from the inner end in the vehicle width direction of the side wall 61*c*. That is, the pair of front and rear trough walls 61*d* and 61*e* are recessed inward in the vehicle width direction with respect to the coupling part 61*a*. The front end of the trough wall 61*d* continues to the front wall 62, and the rear end of the trough wall 61*e* continues to the rear wall 63.

A plurality of holes 60*a*, which are aligned in the vertical direction, are formed in the inner wall 61. The holes 60*a* are formed for weight reduction of the inner center pillar 60. A hole 60*b*, which is larger than the holes 60*a*, is formed in the lower end of the inner wall 61. The hole 60*b* is used to accommodate a seat belt retractor inside the center pillar 8.

In the upper end of the inner wall 61, the groove, which is formed by the coupling part 61*a* and the pair of front and rear side walls 61*b*, 61*c* to protrude outward between the pair of front and rear trough walls 61*d*, 61*e*, is more flattened as the coupling part 61*a* comes closer to the upper part of the vehicle such that the higher the position in the groove is, the closer the coupling part 61*a* comes to the trough walls 61*d* and 61*e* and the shallower the side walls 61*b* and 61*c* become. Then, the coupling part 61*a* continues to the pair of front and rear trough walls 61*d* and 61*e*.

The inner wall 61 of the inner center pillar 60 has a curved shape protruding outward in the vehicle width direction in front view. Specifically, the inner wall 61 of the inner center pillar 60 protrudes outward in the vehicle width direction from the upper end of the inner wall 61 toward the belt line BL to be described below, and extends downward in the vertical direction below the belt line BL. This secures a wide cabin space in the vehicle.

<<Outer Center Pillar>>

The outer center pillar 70 integrally includes an outer wall 71 (outer wall in the vehicle width direction) extending in the longitudinal direction and the vertical direction, a front wall 72 extending inward in the vehicle width direction from the front end of the outer wall 71, and a rear wall 73 extending inward in the vehicle width direction from the rear end of the outer wall 71.

Further, the outer center pillar 70 integrally includes a flange 74 extending forward from the inner end in the vehicle width direction of the front wall 72 and a flange 75 extending rearward from the inner end in the vehicle width direction of the rear wall 73.

<<Stiffener>>

Figure 3:
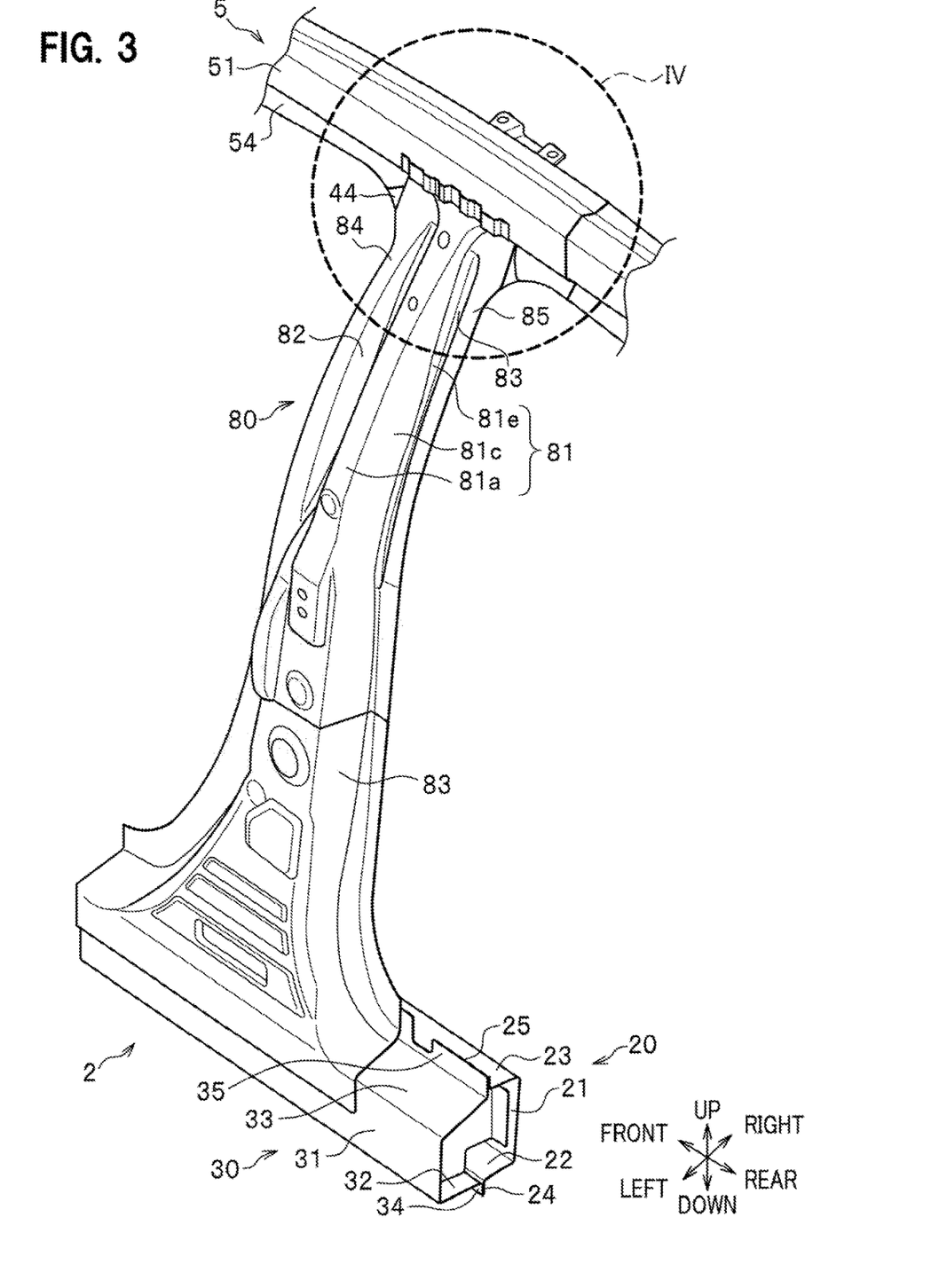
FIG. 3 is a perspective view of the vehicle body side structure according to the embodiment of the present invention, schematically shown, in a state where an inner center pillar and an outer center pillar are removed, as viewed from a rear side outside the vehicle cabin.

The stiffener 80 is a metal reinforcing member interposed between the inner center pillar 60 and the outer center pillar 70. As shown in FIG. 3, the stiffener 80 integrally includes a wall 81 extending in the longitudinal direction and the vertical direction, a front wall 82 extending from the front end of the wall 81, and a rear wall 83 extending from the rear end of the wall 81. Further, the stiffener 80 integrally includes a flange 84 extending forward from the tip end of the front wall 82 and a flange 85 extending rearward from the tip end of the rear wall 83.

The flanges 64, 74, and 84 have joint parts at which at least two or more members are joined together by welding or the like. The joint parts are provided at a plurality of locations arranged in the vertical direction along the flanges 64, 74, and 84. The flanges 65, 75, and 85 have joint parts at which at least two or more members are joined together by welding or the like. The joint parts are provided at a plurality of locations arranged in the vertical direction along the flanges 65, 75, and 85.

The lower end of the inner wall 61 of the inner center pillar 60 is held between the flange 25 and flange 35. The lower end of the outer wall 71 of the outer center pillar 70 and the lower end of the wall 81 of the stiffener 80 are joined to the outer surface in the vehicle width direction of the outer wall 31 of the outer side sill 30 by welding or the like. The lower ends of the front wall 82 and rear wall 83 of the stiffener 80 are joined to the upper surface of the upper wall 33 of the outer side sill 30 by welding or the like. The lower ends of the flanges 84 and 85 of the stiffener 80 are joined to the outer surface in the vehicle width direction of the flange 35 of the outer side sill 30 by welding or the like. The upper end of the outer wall 71 of the outer center pillar 70 is integrally formed with the roof side rail 5 to continue to the roof side rail 5. The roof side rail 5 is formed to be bent so as to cover the vehicle body from an outer side thereof in the vehicle width direction and an upper side thereof and is joined to the roof panel 6 by welding or the like.

<<Upper End of Stiffener>>

Figure 4:
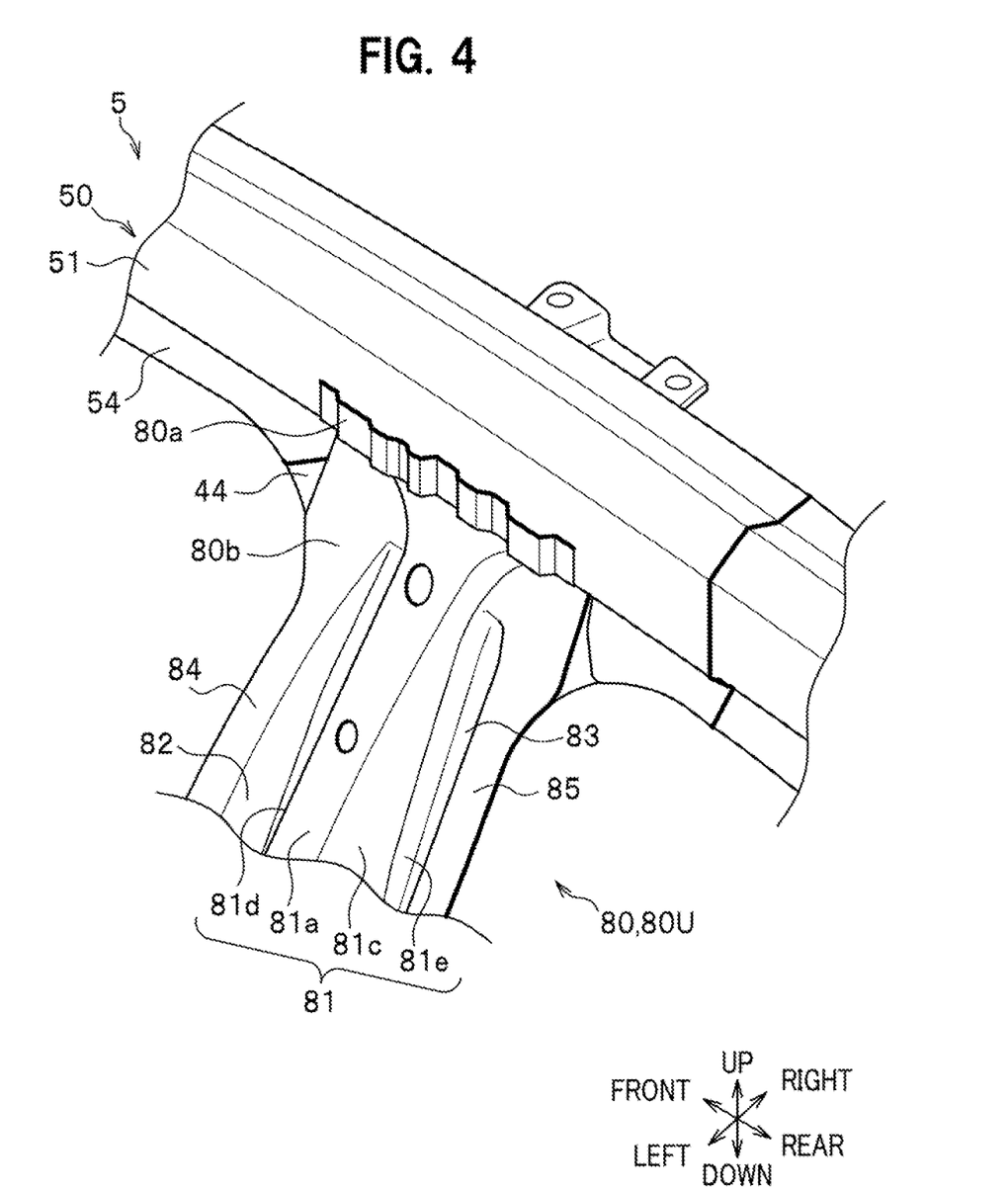
FIG. 4 is an enlarged view of a portion IV in FIG. 3.

As shown in FIG. 4, the upper end of the stiffener 80 does not have troughs 81d and 81e, to be described below, in the wall 81 extending in the longitudinal direction and the vertical direction. That is, in the upper end of the stiffener 80, the trough 81d, which forms the groove together with a coupling wall 81b and the front wall 82, is more flattened with an increasing distance from the lower end of the stiffener 80 such that the higher the position in the groove is, the more the coupling wall 81b and the front wall 82 are oriented toward the flange 84 so that the trough 81d becomes flush with the flange 84. Further, the trough 81e, which forms the groove together with a coupling wall 81c and the rear wall 83, is more flattened with an increasing distance from the lower end of the stiffener 80 such that the higher the position in the groove is, the more the coupling wall 81c and the rear wall 83 are oriented toward the flange 85 so that the trough 81e becomes flush with the flange 85.

An upper part 80a of the upper end of the stiffener 80 is joined to the outer surface in the vehicle width direction of the outer wall 51 of the outer roof side rail 50 by welding or the like. A lower part 80b of the upper end of the stiffener 80 is joined to the outer surface in the vehicle width direction of the flange 44 of the inner roof side rail 40 and the outer surface in the vehicle width direction of the flange 54 of the outer roof side rail 50 by welding or the like.

As described above, the stiffener 80 has the upper end thereof joined to the roof side rail 5 from the outer side in the vehicle width direction. Therefore, when a side collision load is applied to the center pillar 8, the side collision load is transmitted from the stiffener 80 to the roof side rail 5 in a compression direction, so that the joint between the stiffener 80 and the roof side rail 5 by welding or the like is less likely broken.

<<Stiffener Shape (Above the Belt Line)>>

As shown in FIGS. 5 to 8, the stiffener 80 has a substantially W-shape in planar view at the belt line upper part of the stiffener 80 (a part above the belt line BL, and this is also referred to as a stiffener upper part 80U).

The wall 81 integrally includes a crest wall (crest) 81a at a central part in the longitudinal direction, the coupling wall (leg) 81b extending inward in the vehicle width direction from the front end of the crest wall 81a and the coupling wall (leg) 81c extending inward in the vehicle width direction from the rear end of the crest wall 81a. Further, the wall 81 integrally includes the trough 81d extending forward from the inner end in the vehicle width direction of the coupling wall 81b and the trough 81e extending rearward from the inner end in the vehicle width direction of the coupling wall 81c. That is, the crest wall 81a protrudes outward in the vehicle width direction with respect to the pair of front and rear troughs 81d and 81e, and the pair of front and rear troughs 81d and 81e are recessed inward in the vehicle width direction with respect to the crest wall 81a.

The front end of the trough 81d continues to the front wall 82, and the rear end of the trough 81e continues to the rear wall 83.

The crest wall 81a faces (preferably abuts) the inner surface in the vehicle width direction of the outer wall 71 of the outer center pillar 70.

Figure 5:
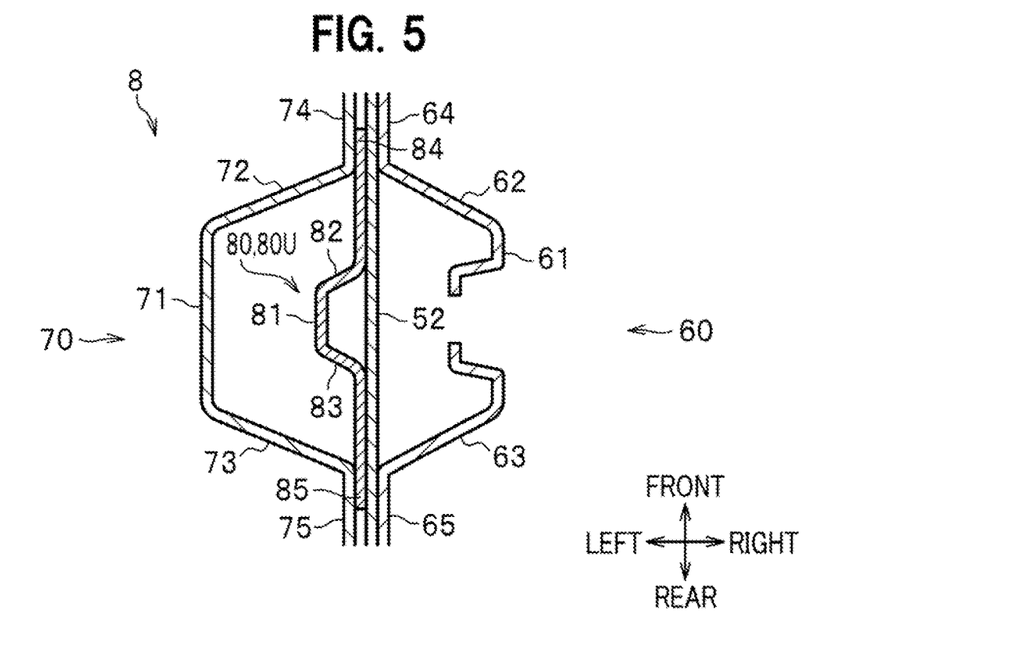
FIG. 5 is a cross-sectional view taken along a line V-V in FIG. 2.
Figure 6:
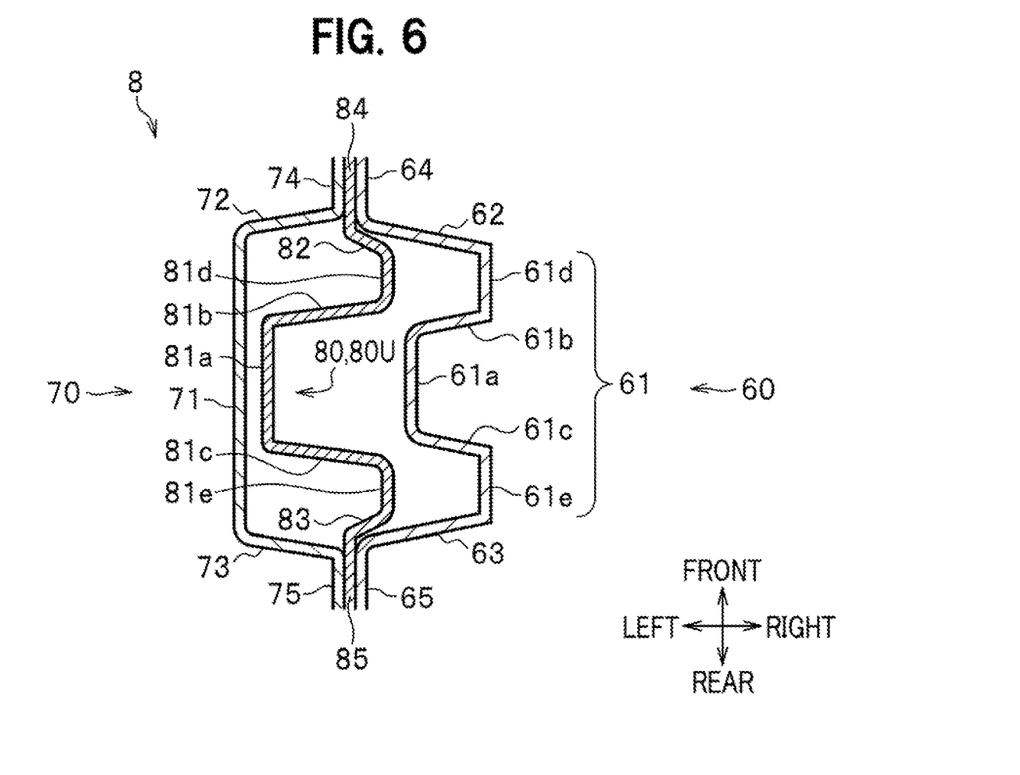
FIG. 6 is a cross-sectional view taken along a line VI-VI in FIG. 2.

The pair of front and rear troughs 81d and 81e is formed at least between the belt line upper part (above the belt line BL) and the upper end (near) of the stiffener 80, and are formed integrally with the crest wall 81a at the belt line BL and the upper end of the stiffener 80 (see the upper end shown in FIG. 5). The pair of front and rear troughs 81d and 81e forms the deepest part A1 at a height between the belt line BL and the upper end of the stiffener 80 (see FIG. 7). Further, the pair of front and rear troughs 81d and 81e forms variable parts A2 and A3 where the troughs 81d and 81e gradually become shallower in the vehicle width direction as coming closer to the belt line BL and the upper end of the stiffener 80 from the deepest part A1 (see FIG. 6 and FIG. 8).

Figure 7:
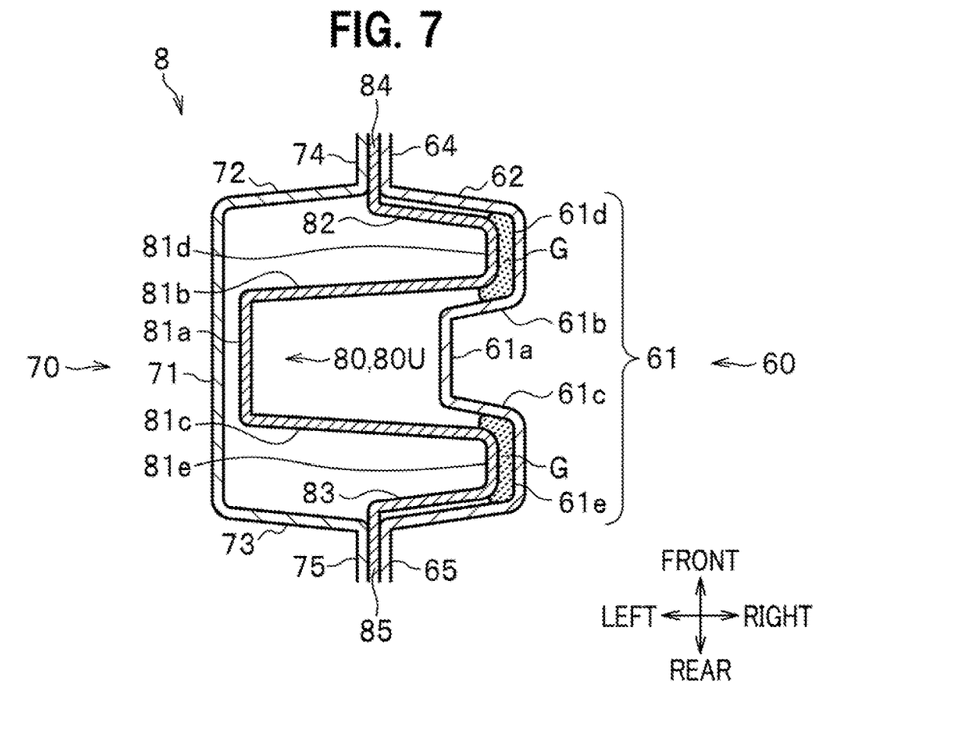
FIG. 7 is a cross-sectional view taken along a line VII-VII in FIG. 2.
Figure 8:
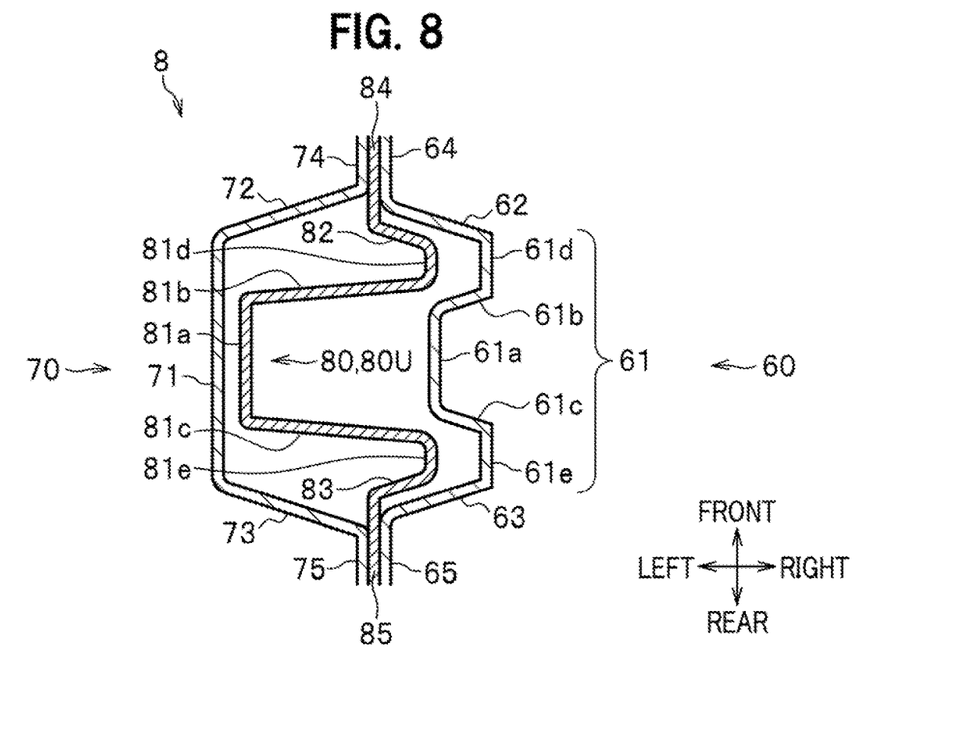
FIG. 8 is a cross-sectional view taken along a line VIII-VIII in FIG. 2.

As shown in FIG. 7, the pair of front and rear troughs 81d and 81e is adhered and joined at the deepest part A1 to the inner wall 61 of the inner center pillar 60 with an adhesive (adhesion layer) G.

When the troughs 81d, 81e and the trough walls 61d, 61e are adhered closely to each other, a redundant adhesive G is pushed out from the adhered portion and moved to a surrounding space. Accordingly, the adhesive G is pushed out beyond bent parts (bent ridge line parts) where the front ends and rear ends of the troughs 81d, 81e and trough walls 61d, 61e meet, to adhere the coupling wall 81b and the side wall 61b, the front wall 82 and the front wall 62, the coupling wall 81c and the side wall 61c, and the rear wall 83 and the rear wall 62 to each other (see FIG. 7).

The adhesive G is a structural adhesive, and is desirably a high toughness type or a high viscosity type. When the adhesive G is a high toughness type, the adhesive G suitably prevents cracking of the adhesive due to torsion of the vehicle body or the like, to improve the durability of adhesion. When the adhesive G is a high viscosity type, the adhesive G is prevented from dropping even when the adhesive G is applied to protruding portions such as the troughs 81d and 81e.

<<Stiffener Shape (Below Belt Line)>>

Figure 9:
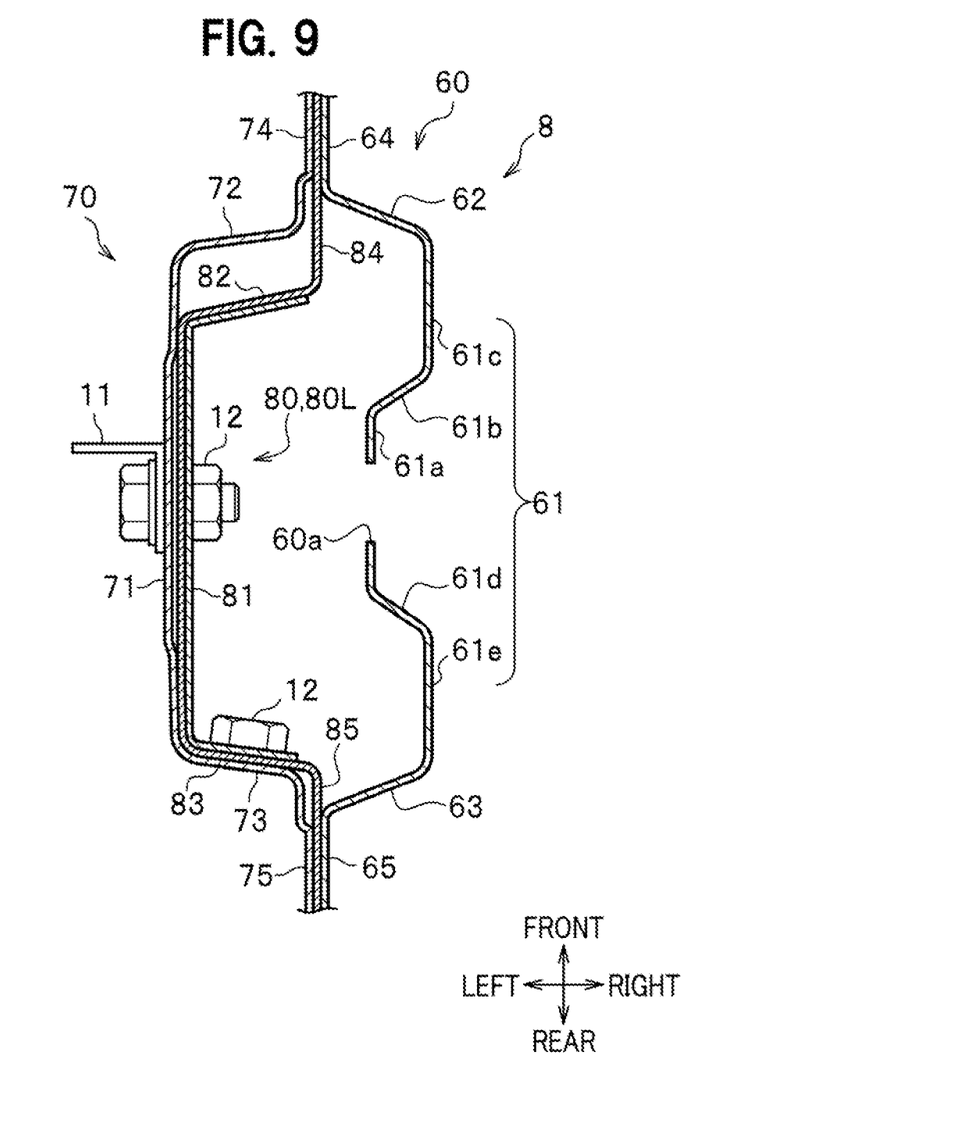
FIG. 9 is a cross-sectional view taken along a line IX-IX in FIG. 2.
Figure 10:
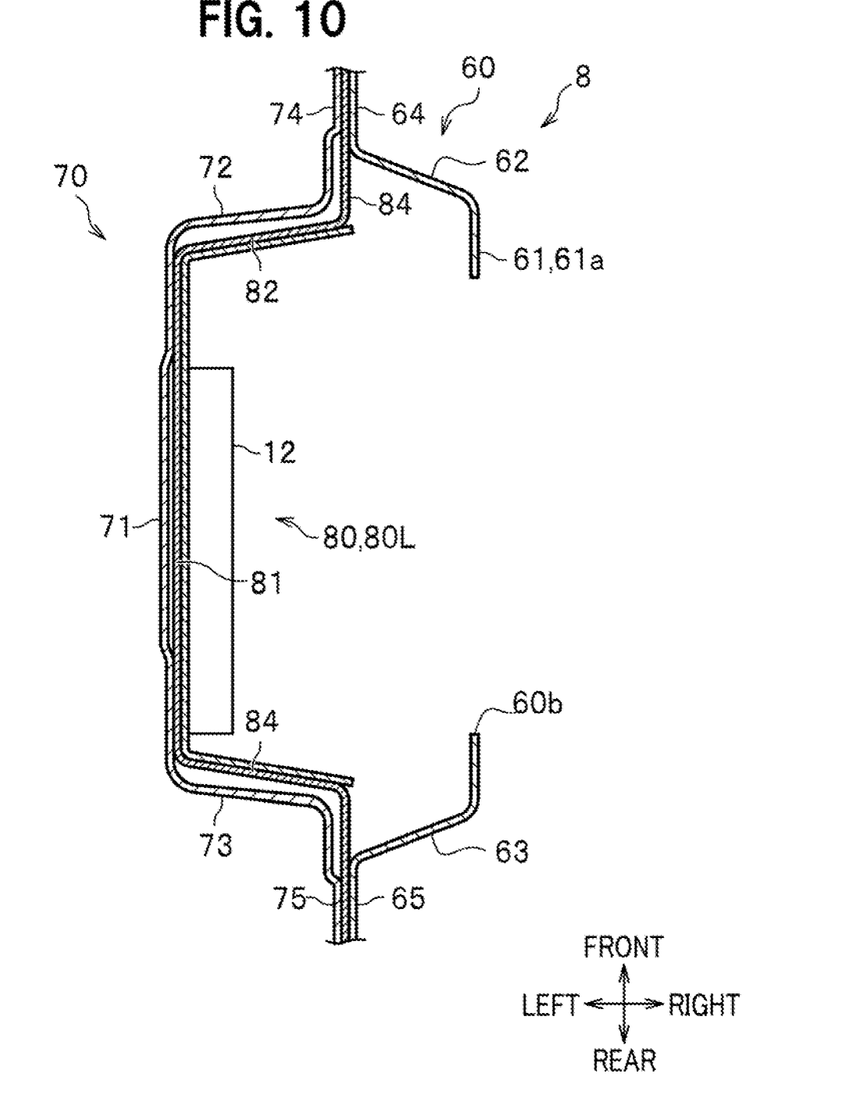
FIG. 10 is a cross-sectional view taken along a line X-X in FIG. 2.

As shown in FIGS. 9 and 10, the stiffener 80 has a substantially hat shape in planar view at the belt line lower part (below the belt line BL, and this is also referred to as a stiffener lower part 80L). That is, the coupling walls 81b and 81c are separated away from each other, the troughs 81d and 81e are gradually recessed shallower in the vehicle width direction, and the parts as the coupling walls 81b and 81c form the front wall 82 and the rear wall 83 to connect the wall 81 (crest wall 81a) with the flanges 84 and 85.

As shown in FIG. 9, mounting components 12 (nuts) are provided on the wall 81 (wall in the vehicle width direction) and the rear wall 83 of the stiffener 80, and an mounting component 11 (bracket for a door hinge, for example) is joined (fixed with a bolt, for example) to at least one of the outer wall 71 and rear wall 73 of the outer center pillar 70.

The thickness of the coupling walls 81b and 81c is desirably thicker than that of at least one of the crest wall 81a and the troughs 81d, 81e.

In the present embodiment, the thickness of the coupling walls 81b and 81c are thicker than that of the troughs 81d and 81e.

<Seat Mounting Bracket>

As shown in FIGS. 1 and 2, the seat mounting bracket 9 is a bracket to which a seat in the vehicle cabin is mounted, and is a metal frame member to reinforce a corner, in front view, formed by the end in the vehicle width direction of the cross member 4 and the inner side sill 20.

The seat mounting bracket 9 has a substantially U-shaped cross-sectional shape with an opening on the lower side in side view, and has a substantially U-shaped cross-sectional shape with an opening on the outer side in the vehicle width direction in planar view. The lower end of the seat mounting bracket 9 is joined to the cross member 4 by welding or the like, and the outer end in the vehicle width direction of the seat mounting bracket 9 is joined to the inner side sill 20 by welding or the like.

<Roof Arch Connecting Bracket>

The roof arch connecting bracket 10 is a bracket to connect the inner center pillar 60 to the roof arch 7, and is a metal frame member to reinforce a corner, in front view, formed by the end in the vehicle width direction of the roof arch 7 and the inner center pillar 60. The roof arch connecting bracket 10 has a substantially U-shaped cross-sectional shape with an opening on the upper side in side view, and has a substantially U-shaped cross-sectional shape with an opening on the outer side in the vehicle width direction in plan view. The upper end of the roof arch connecting bracket 10 is joined to the roof arch 7 by welding or the like, and the outer end in the vehicle width direction of the bracket 10 is joined to the upper end of the inner center pillar 60 by welding or the like.

The vehicle body side structure 1 according to the embodiment of the present invention has following features. The vehicle body side structure 1 includes: the roof side rail 5 extending in the longitudinal direction on the upper side and lateral side of the vehicle; the center pillar 8 extending downward of the vehicle from the roof side rail 5 and formed as the assembly of the outer center pillar 70 and the inner center pillar 60; and the stiffener 80 extending in the vertical direction of the vehicle within the center pillar 8. The stiffener 80 has the stiffener upper part 80U provided above the central part in the height direction of the center pillar 8. The stiffener upper part 80U is joined at the upper end thereof to the roof side rail 5 from the outer side in the vehicle width direction. The stiffener upper part 80U has the troughs 81d and 81e extending in the vertical direction of the vehicle and recessed inward in the vehicle width direction. The troughs 81d and 81e are recessed deeper as coming closer to the central part in the vertical direction of the stiffener upper part 80U from the upper end and lower end of the stiffener upper part 80U.

Therefore, in the vehicle body side structure 1, the troughs 81d and 81e, extending in the longitudinal direction of the stiffener 80 and recessed inward in the vehicle width direction, are formed to be the deepest at the central part in the vertical direction of the belt line upper part to be reinforced most in the three-point bending of the center pillar 8, for example. The closer to the upper end and the lower end, the less the center pillar 8 needs to be reinforced. Therefore, the shallower the troughs 81d and 81e protrude toward the vehicle cabin. As a result, the stiffener 80 is reduced in size, to have the center pillar 8 reduced in weight and increased rigidity.

Further, the vehicle body side structure 1 suitably prevents deformation of the center pillar 8 and separation of the stiffener 80 from the roof side rail 5 due to the side collision load.

Still further, in the vehicle body side structure 1, the stress acting on the stiffener 80 is transmitted so as to press the roof side rail 5 outward (transmitted as a compression load), to suitably prevent the stiffener 80 from being separated due to the side collision load.

Further, the vehicle body side structure 1 has a feature that the central part in the height direction is at the belt line BL of the vehicle.

Therefore, in the vehicle body side structure 1, the belt line upper part of the center pillar 8 is made thin in the longitudinal direction to secure visibility, and the belt line lower part of the center pillar 8 is made thick in the longitudinal direction to suitably mount the doors.

Further, the vehicle body side structure 1 has following features. The stiffener upper part 80U includes the pair of front and rear troughs 81d and 81e, and the crest (crest wall) 81a protruding outward in the vehicle width direction between the pair of front and rear troughs 81d and 81e. The troughs 81d and 81e are formed integrally with the crest at the upper end of the stiffener upper part 80U. The upper end of the stiffener upper part 80U is joined to the outer wall 51 in the vehicle width direction of the roof side rail 5.

Therefore, the vehicle body side structure 1 more suitably supports the side collision load, having the crest 81a and the troughs 81d, 81e formed so as to run across the entire width in the vehicle width direction of the center pillar 8. The crest 81a suitably transmits the side collision load from the upper end of the stiffener 80 to the roof side rail 5. Further, the pair of troughs 81d and 81e is formed in front of and behind the crest 81a, which increase the cross section of the stiffener 80 so as to run across the entire cross section of the center pillar 8 at the belt line upper part having a narrow width in the longitudinal direction, for example.

Further, the vehicle body side structure 1 has following features. The upper part 80a of the upper end of the stiffener upper part 80U is joined to the outer wall in the vehicle width direction of the roof side rail 5. The lower part 80b of the upper end of the stiffener upper part 80U is joined to the flanges 44 and 54 extending downward from the lower walls 42 and 52 of the roof side rail 5.

Therefore, in the vehicle body side structure 1, the troughs 81d and 81e are formed integrally with the crest 81a at the upper end of the stiffener upper part 80U, so that a large joining area of the stiffener 80 to the flanges 44 and 54 is secured, to firmly join the stiffener 80 with the roof side rail 5.

Further, the vehicle body side structure 1 has a feature that the stiffener 80 includes the pair of front and rear legs (coupling walls 81b and 81c) coupling the crest and the pair of front and rear troughs.

Therefore, the vehicle body side structure 1 has the thickness of the leg made thicker than that of at least one of the crest 81a and the troughs 81d, 81e, for example, to improve the rigidity and strength of the legs against the side collision load. Further, at least one of the crest 81a and the troughs 81d, 81e is made thinner than the legs, to improve side collision performance and weight reduction of the vehicle body side structure 1.

Further, the vehicle body side structure 1 has following features. The inner wall 61 in the vehicle width direction of the center pillar 8 has a curved shape to protrude outward in the vehicle width direction in front view. The pair of front and rear troughs of the stiffener 80 and the inner wall 61 in the vehicle width direction of the center pillar 8 is joined by adhesion.

Therefore, in the vehicle body side structure 1, when the curved shape and the troughs are brought into contact to each other at the time of assembling, the redundant adhesive G is pushed out to the variable parts A2 and A3, so that the inner wall 61 in the vehicle width direction of the center pillar 8 and the stiffener 80 are reliably and firmly joined to each other, without being affected by the component variations.

Further, in the vehicle body side structure 1, the apex of the stiffener 80 in a convex inward shape and the apex of the inner center pillar 60 in a convex outward shape are adhered to each other. Therefore, the load received by the roof side rail 5 due to rollover is dispersed to the outer center pillar 70 and the inner center pillar 60 via the stiffener 80.

Further, the vehicle body side structure 1 has following features. The inner wall 61 in the vehicle width direction of the center pillar 8 includes the pair of front and rear trough walls 61d and 61e recessed inward in the vehicle width direction. The pair of front and rear troughs 81d, 81e of the stiffener 80 is joined by adhesion with the pair of front and rear trough walls 61d, 61e of the center pillar 8.

Therefore, in the vehicle body side structure 1, the troughs 81d, 81e of the stiffener 80 are easily assembled with the trough walls 61d, 61e of the center pillar 8, to further improve a reinforcing effect of the stiffener 80 by adhesive joining. Therefore, the side collision performance is improved even with a structure having a thin cross section of the center pillar 8.

Further, the vehicle body side structure 1 includes the roof arch 7 extending in the vehicle width direction at the upper end of the vehicle. The inner wall 61 (trough walls 61d, 61e) in the vehicle width direction of the center pillar 8 are joined to the roof arch 7 at the inner side in the vehicle width direction of the roof side rail 5 (via the roof arch connecting bracket 10).

Therefore, the load received by the roof side rail 5 due to rollover is transmitted from the stiffener 80 to the trough walls 61d and 61e (inner wall 61 in the vehicle width direction) of the inner center pillar 60, so that the vehicle body side structure 1 has the improved strength and rigidity of the vehicle.

Further, the vehicle body side structure 1 has following features. The vehicle body side structure 1 includes the side sill 2 extending in the longitudinal direction of the vehicle at the lower side and lateral side of the vehicle. The lower end of the center pillar 8 is joined to the side sill 2. The stiffener 80 continues from the upper end of the center pillar 8 to the side sill 2. The troughs 81d and 81e are formed integrally with the crest 81a from the central part in the vertical direction of the stiffener upper part 80U toward the central part in the height direction.

Therefore, it is easy to manufacture the stiffener 80, of the vehicle body side structure, having a substantially W-shaped cross-sectional shape at apart above the central part in the height direction (above the belt line upper part, for example) and a substantially hat cross-sectional shape at a part below the central part in the height direction (below the belt line lower part, for example), that is, vertically different cross-sectional shapes. The stiffener 80 suitably matches the cross section of the center pillar 8.

Further, the vehicle body side structure 1 has following features. The crest 81a is formed down to the stiffener lower part 80L provided below the central part in the height direction of the stiffener 80. The crest 81a of the stiffener lower part 80L is joined to the outer wall 71 in the vehicle width direction of the center pillar 8. The mounting component 12 is tightened at the joint part between the crest 81a and the outer wall 71 in the vehicle width direction.

Therefore, the vehicle body side structure 1 has the cross-sectional strength of the center pillar 8 (strength to a load to deform the cross section) improved by the mounting component 12.

Although the embodiment of the present invention has been described above, the present invention is not limited thereto and can be appropriately modified within the scope of the present invention. The central part in the height direction of the center pillar 8 is not limited to at the belt line BL, for example, and the deepest parts A1 of the troughs 81d and 81e only need to be located at a vertically central part between the belt line BL and the upper end of the center pillar 8. Further, the stiffener 80 may have one trough. Still further, the vehicle body side structure of the present invention is not limited to the center pillar of the vehicle, but may be applied to a rear pillar of the vehicle.

What is claimed is:

1. A vehicle body side structure comprising:
a roof side rail extending in a longitudinal direction of a vehicle on an upper side and a lateral side of the vehicle;
a center pillar extending downward of the vehicle from the roof side rail and formed as an assembly of an outer center pillar and an inner center pillar; and
a stiffener extending in a vertical direction of the vehicle within the center pillar,
wherein the stiffener has a stiffener upper part provided above a belt line of the vehicle which is at a central part in a height direction of the center pillar,
wherein the stiffener upper part is joined at an upper end thereof to the roof side rail from an outer side in a vehicle width direction,
wherein the stiffener upper part has a pair of front and rear troughs extending in the vertical direction of the vehicle and recessed inward in the vehicle width direction,
wherein the stiffener upper part has a crest protruding outward in the vehicle width direction between the pair of front and rear troughs, and
wherein the troughs are recessed deeper as coming closer to a central part in the vertical direction of the stiffener upper part from the upper end and a lower end of the stiffener upper part, and are integrally formed with the crest at the belt line.

2. The vehicle body side structure as claimed in claim 1, wherein the troughs are integrally formed with the crest at the upper end of the stiffener upper part, and
wherein the upper end of the stiffener upper part is joined to an outer wall in the vehicle width direction of the roof side rail.

3. The vehicle body side structure as claimed in claim 2, wherein an upper part of the upper end of the stiffener upper part is joined to the outer wall in the vehicle width direction of the roof side rail, and
wherein a lower part of the upper end of the stiffener upper part is joined to a flange extending downward from a lower wall of the roof side rail.

4. The vehicle body side structure as claimed in claim 1, wherein the stiffener has a pair of front and rear legs coupling the crest and the pair of front and rear troughs.

5. The vehicle body side structure as claimed in claim 1, wherein an inner wall in the vehicle width direction of the center pillar has a curved shape protruding outward in the vehicle width direction in front view, and
wherein the pair of front and rear troughs of the stiffener and the inner wall in the vehicle width direction of the center pillar is joined to each other by adhesion.

6. The vehicle body side structure as claimed in claim 1, wherein an inner wall in the vehicle width direction of the center pillar has a pair of front and rear trough walls recessed inward in the vehicle width direction, and
wherein the pair of front and rear troughs of the stiffener and the pair of front and rear trough walls of the center pillar are joined to each other by adhesion.

7. The vehicle body side structure as claimed in claim 6 further comprising a roof arch extending in the vehicle width direction at an upper end of the vehicle,
wherein the inner wall in the vehicle width direction of the center pillar is joined to the roof arch on an inner side in the vehicle width direction of the roof side rail.

8. The vehicle body side structure as claimed in claim 2 further comprising a side sill extending in the longitudinal direction of the vehicle on a lower side and the lateral side of the vehicle;
   wherein a lower end of the center pillar is joined to the side sill, and
   wherein the stiffener continues from the upper end of the center pillar to the side sill.

9. The vehicle body side structure as claimed in claim 8, wherein the crest is formed down to a stiffener lower part of the stiffener provided below the belt line, and
   wherein an outer wall in the vehicle width direction of the center pillar is joined to the crest of the stiffener lower part, and a mounting component is tightened at a joint part between the crest and the outer wall in the vehicle width direction.

\* \* \* \* \*